United States Patent
Ye et al.

(10) Patent No.: US 10,731,265 B2
(45) Date of Patent: Aug. 4, 2020

(54) SPENT FUEL DRY-PROCESS REPROCESSING METHOD FOR DIRECTLY OBTAINING ZIRCONIUM ALLOY NUCLEAR FUEL

(71) Applicant: CHINA INSTITUTE OF ATOMIC ENERGY, Beijing (CN)

(72) Inventors: Guoan Ye, Beijing (CN); Yinggen Ouyang, Beijing (CN); Changshui Wang, Beijing (CN); Lisheng Liu, Beijing (CN); Jianhua Guo, Beijing (CN); Ruixue Li, Beijing (CN); Li Chang, Beijing (CN); Shangwen Chang, Beijing (CN); He Yang, Beijing (CN); Wei Gao, Beijing (CN); Huibo Li, Beijing (CN); Songtao Xiao, Beijing (CN)

(73) Assignee: China Institute of Atomic Energy, Beijing (CN)

( * ) Notice: Subject to any disclaimer, the term of this patent is extended or adjusted under 35 U.S.C. 154(b) by 2 days.

(21) Appl. No.: 15/746,833

(22) PCT Filed: Jul. 31, 2015

(86) PCT No.: PCT/CN2015/085720
§ 371 (c)(1),
(2) Date: Jan. 23, 2018

(87) PCT Pub. No.: WO2017/015975
PCT Pub. Date: Feb. 2, 2017

(65) Prior Publication Data
US 2018/0216245 A1 Aug. 2, 2018

(30) Foreign Application Priority Data
Jul. 24, 2015 (CN) .......................... 2015 1 0441665

(51) Int. Cl.
*C25C 3/36* (2006.01)
*G21C 19/48* (2006.01)

(52) U.S. Cl.
CPC ............... *C25C 3/36* (2013.01); *G21C 19/48* (2013.01)

(58) Field of Classification Search
CPC .............. G21C 19/42–44; G21C 19/48; C25D 3/66–665; C25C 3/34
See application file for complete search history.

(56) References Cited

U.S. PATENT DOCUMENTS

| | | | | |
|---|---|---|---|---|
| 3,052,537 A | * | 9/1962 | Moore | C22C 1/02 420/1 |
| 3,479,158 A | * | 11/1969 | Cook | C25D 3/66 205/231 |
| 2010/0126872 A1 | * | 5/2010 | Paneccasio, Jr. | C25D 3/38 205/123 |
| 2010/0126874 A1 | * | 5/2010 | Watanabe | C25C 3/34 205/354 |
| 2016/0053391 A1 | * | 2/2016 | Loewen | G21C 3/60 205/44 |

FOREIGN PATENT DOCUMENTS

JP H06-057479 A * 3/1994
JP 2006308442 A * 11/2006

OTHER PUBLICATIONS

Kimura et al., Machine Translation, JP H06-057479 A (Year: 1994).*
Vossen et al., Thin Film Processes, 242 (Year: 1978).*
Atkins et al., Atkins' Physical Chemistry 186 (Year: 2010).*
Bard et al., Electrochemical Dictionary 9 (Year: 2008).*
Fujita et al., Machine Translation, JP 2006-308442 A (Year: 2006).*

* cited by examiner

*Primary Examiner* — Brian W Cohen
*Assistant Examiner* — Ho-Sung Chung
(74) *Attorney, Agent, or Firm* — Xinsheng Wang

(57) ABSTRACT

The present invention relates to a spent fuel dry reprocessing method for directly obtaining a zirconium alloy nuclear fuel, comprising: determining components and a ratio of a molten salt composition used for melting a spent fuel according to a requirement of reactor design on a zirconium alloy fuel and contents of actinium series metals in the spent fuel; melting the spent fuel in the above molten salt composition; and selecting an electrode pair for electrodeposition so that zirconium in the molten salt composition and uranium ions in the spent fuel or uranium and other actinium series metal ions are subjected to co-deposition, thereby obtaining the zirconium alloy nuclear fuel meeting a design requirement. The spent fuel dry reprocessing method provided by the invention is suitable for oxide spent fuel and metal spent fuel, and is simple and controllable in process, low in energy consumption, low in cost and easy to industrialize.

5 Claims, No Drawings

SPENT FUEL DRY-PROCESS REPROCESSING METHOD FOR DIRECTLY OBTAINING ZIRCONIUM ALLOY NUCLEAR FUEL

FIELD OF INVENTION

The present invention relates to the field of nuclear fuel reprocessing and particularly, to a spent fuel dry-process reprocessing method for directly obtaining zirconium alloy fuel.

BACKGROUND OF THE INVENTION

Fuels for fast reactor mainly include two types: an oxide ceramic fuel and a metal fuel. A breeding ratio of the metal fuel used by fast reactor for the purpose of fuel breeding is over 20% higher than that of the oxide ceramic fuel, wherein a zirconium alloy fuel becomes a preferred alloy fuel type for fast reactor due to its excellent nuclear properties and physical properties.

Molten salt electrolysis is the most active spent fuel dry reprocessing technology for research. Spent fuel dry reprocessing adopts different molten salt electrolysis processes depending on whether the spent fuel is a metal oxide or a metal spent fuel. At present, the spent fuel dry reprocessing, internationally, mainly adopts a chloride molten salt electrolysis refining technology which is as follow: for the metal oxide spent fuel, metal oxide is first reduced to metal using metal lithium (or metal lithium is generated by electrolysis), and then the obtained metal, on a chloride molten salt, is subjected to controlled potential melting and controlled potential deposition, so as to respectively obtain uranium and uranium plutonium alloy fuel.

A patent reported a dry reprocessing molten salt system for preparing an aluminum alloy fuel. Aluminum alloy cannot completely meet the needs of the fast neutron reactor due to its low melting point. However, the zirconium alloy fuel has a high melting point, which is beneficial to the stable operation of the fast reactor. At present, the method for preparing the zirconium alloy fuel internationally comprises the steps of first obtaining uranium, plutonium and zirconium metals and then mixing the three metals in a ratio for melting. But, a process of preparing an alloy fuel by melting with pure metals is extremely high in cost, in which pure metal materials are first obtained through a metallurgical process and then the pure metals in a ratio are mixed for melting, and thus, the process is complicated, waste is high, energy consumption is high and cost is large.

SUMMARY OF THE INVENTION

With respect to the defects existing in the prior art, it is an object of the present invention to provide a spent fuel dry reprocessing method for directly obtaining the zirconium alloy fuel, and this method is simple and controllable in process, low in energy consumption, low in cost and easy to industrialize.

In order to achieve the above object, a technical solution adopted by the present invention is as follows: a spent fuel dry reprocessing method for directly obtaining zirconium alloy fuel comprises the following steps:

determining components and a ratio of a molten salt composition used for melting a spent fuel according to a zirconium alloy fuel design requirement and contents of actinium series metals in the spent fuel;

melting the spent fuel in the above molten salt composition; and selecting an electrode pair for electrodeposition so that zirconium in the molten salt composition and uranium ions in the spent fuel or uranium and other actinium series metal ions are subjected to co-deposition, thereby obtaining a zirconium alloy nuclear fuel meeting the zirconium alloy fuel design requirement.

Further, the molten salt composition at least comprises zirconium fluoride, potassium fluoride and lithium fluoride, and a mole ratio of zirconium fluoride to potassium fluoride to lithium fluoride is 1:(10-20):(25-80).

Further, determining components and a ratio for a molten salt composition comprises the steps: first, determining an amount of zirconium fluoride according to a zirconium alloy nuclear fuel design requirement, and then determining amounts of potassium fluoride and lithium fluoride according to a Nernst equation and a target melting point temperature of the molten salt composition.

Further, a mixture of the spent fuel and the molten salt composition is molten at 600-1050° C., and a preferred melting temperature is the lowest eutectic point temperature +50° C. of the proportioned molten salt.

Further, according to the zirconium alloy fuel design requirement, if some metal ions in the molten spent fuel are in excess, pre-electrodeposition is carried out through an additional electrode pair so that the excess metal ions in the spent fuel are separated out.

Further, if the spent fuel is a metal oxide spent fuel, a positive electrode of the electrode pair used in the pre-electrodeposition processes to separate out the excess metal ions and a positive electrode of the electrode pair used in electrodeposition to form a zirconium alloy nuclear fuel is made of inert material.

Alternatively, if the spent fuel is a metal spent fuel, the positive electrode of the electrode pair used in the process of pre-electrodepositing to separate out the excess metal ions is the metal spent fuel.

The method provided by the present invention is simple and controllable in process, there is no a process of preparing pure metals but the spent fuel is directly added into the molten salt composition, and the desired zirconium alloy fuel is directly obtained through electrodeposition as long as the ratio of the molten salt composition is adjusted; in addition, this method is suitable for a metal oxide spent fuel and a metal spent fuel, and is low in energy consumption, low in cost and easy to industrialize.

DETAILED DESCRIPTION OF THE INVENTION

The present invention will be further described in combination with embodiments. wt % in examples represents a mass percent.

EXAMPLE 1

This example adopts an uranium dioxide ceramic spent fuel.

A target alloy fuel: a zirconium-uranium alloy fuel, which comprises the components: 95 wt % of uranium and 5 wt % of zirconium.

A preparation method of the zirconium-uranium alloy fuel is as follows:

determining a molten salt composition: 5 wt % of zirconium fluoride, 35 wt % of potassium fluoride and 60 wt % of lithium fluoride according to the components of the above zirconium-uranium alloy fuel, components of the spent fuel and an electrodeposition principle (Nernst equation);

directly putting 11 g of sintered uranium dioxide pellet into 1500 g of molten salt containing 5 wt % of zirconium fluoride, 35 wt % of potassium fluoride and 60 wt % of lithium fluoride, and melting the uranium dioxide pellet in the molten salt composition at a temperature of 750° C.; and carrying out pre-electrodeposition using an electrode pair with graphite as a positive pole and an uranium bar as a negative pole, wherein the controlled potential of the negative pole is −1.2~−1.4V (relative to a Ag/AgCl reference electrode) so that 1.2 g of excess uranium is deposited on the negative pole; and subsequently, carrying out electrodeposition using an electrode pair with graphite as the positive pole and a metal uranium wire having a diameter of 1 mm as the negative pole, wherein the controlled precipitation potential of the negative pole is −1.6~−2.0V (which is adjusted according to a uranium-zirconium ratio of deposited alloy and a requirement on a decontamination factor of rare earth) so that zirconium is first deposited on the negative pole, then uranium is also deposited on the negative pole through an under-potential deposition principle to form alloy with zirconium, and finally, 95 wt % uranium-5 wt % zirconium alloy in a calculated ratio is obtained on the negative pole.

EXAMPLE 2

This example adopts an uranium plutonium alloy spent fuel.

A target alloy fuel: a zirconium-uranium-plutonium alloy fuel, which comprises the components: 76 wt % of uranium, 5 wt % of zirconium and 19 wt % of plutonium.

A preparation method of the zirconium-uranium-plutonium alloy fuel is as follows:

determining a molten salt composition: 10 wt % of zirconium fluoride, 50 wt % of potassium fluoride and 40 wt % of lithium fluoride according to the components of the above zirconium-uranium-plutonium alloy fuel, components of the spent fuel and an electrodeposition principle (Nernst equation);

directly putting 50 g of uranium-plutonium alloy spent fuel as a positive pole into 3000 g of molten salt containing 10 wt % of zirconium fluoride, 50 wt % of potassium fluoride and 40 wt % of lithium fluoride, and carrying out controlled potential melting and controlled potential electrodeposition at a temperature of 850° C.; and when the controlled melting potential is 1.2-1.6V (relative to a Ag/AgCl reference electrode), melting a uranium-plutonium alloy spent fuel in the above molten salt composition;

carrying out electrodeposition using double negative poles, wherein both of negative pole materials use metal uranium wires having a diameter of 1 mm, the controlled potential of one of the negative poles is −1.2~−1.5V (relative to a Ag/AgCl reference electrode) so that 21 g of excess uranium is deposited on the negative pole, the controlled precipitation potential of the other negative pole is −1.8~−2.3V (which is adjusted according to a zirconium-uranium-plutonium ratio of a target deposited alloy and a requirement on a decontamination factor of rare earth) so that zirconium is first deposited on the negative pole, then uranium is deposited on the negative pole, and then plutonium is also deposited on the negative pole through an under-potential deposition principle to form alloy with zirconium, and finally, 76 wt % uranium-5 wt % zirconium-19 wt % plutonium alloy in a calculated ratio is obtained on the negative poles.

By adoption of the method provided by the present invention, the concentration of zirconium fluoride in the molten salt and the concentration of uranium remained in the molten salt after pre-electrodeposition are adjusted so as to obtain uranium-zirconium alloy having a (uranium+plutonium)-zirconium mole ratio of 100-50.

The above examples merely exemplify the present invention, and the present invention can also be implemented in other specific manners or other specific forms without departing from the essence or substantive characteristics of the invention. Thus, the described embodiments are all considered as being illustrative but not limiting in term of any viewpoints. The scope of the invention should be described by additional claims, and any variations equivalent to the intention and scope of the claims should be contained in the scope of the present invention as well.

What is claimed is:

1. A spent fuel dry reprocessing method for directly obtaining a zirconium alloy nuclear fuel, comprising the steps:
  a. determining components and a ratio for a molten salt composition used for melting a spent fuel according to a zirconium alloy fuel design requirement and contents of actinium series metals in the spent fuel, wherein the molten salt composition comprises zirconium fluoride, potassium fluoride and lithium fluoride, and wherein a mole ratio of zirconium fluoride to potassium fluoride to lithium fluoride is 1:(10-20):(25-80);
  b. melting the spent fuel in the molten salt composition; and
  c. forming a zirconium alloy comprising uranium, zirconium and plutonium with a composition according to said zirconium alloy fuel design requirement, wherein said zirconium is derived from said molten salt composition, and said zirconium alloy is formed by an under-potential deposition process on an electrode, thereby obtaining a zirconium alloy nuclear fuel through uranium-plutonium-zirconium co-electrodeposition on the electrode.

2. The spent fuel dry reprocessing method according to claim 1, wherein a mixture of the spent fuel and the molten salt composition is molten at 600-1050° C.

3. The spent fuel dry reprocessing method according to claim 1, wherein the molten spent fuel has excess metal ions, and a pre-electrodeposition process is carried out through a second electrode pair so the excess metal ions in the spent fuel are separated.

4. The spent fuel dry reprocessing method according to claim 3, wherein the spent fuel is a metal oxide spent fuel, a positive electrode of the second electrode pair used in the pre-electrodeposition process to separate out the excess metal ions and a positive electrode of the first electrode pair selected for the electrodeposition process to form the zirconium alloy nuclear fuel are made of inert material.

5. The spent fuel dry reprocessing method according to claim 3, wherein the spent fuel is a metal spent fuel, and a positive electrode of the second electrode pair used in the pre-electrodeposition process to separate out the excess metal ions is the metal spent fuel.

* * * * *